United States Patent [19]

Kim et al.

[11] Patent Number: 4,720,976
[45] Date of Patent: * Jan. 26, 1988

[54] METHOD OF POWER GENERATION AND ITS APPARATUS UTILIZING GRAVITATION FORCE AND BUOYANCY

[75] Inventors: Myung K. Kim, 9018 Dolfield Rd., Owings Mills, Md. 21117; Se E. Lee, Seoul, Rep. of Korea

[73] Assignee: Myung Kyoon Kim, Owings Mill, Md.

[*] Notice: The portion of the term of this patent subsequent to Jul. 15, 2003 has been disclaimed.

[21] Appl. No.: 947,805

[22] Filed: Dec. 30, 1986

[51] Int. Cl.$^4$ .............................................. F03G 3/00
[52] U.S. Cl. ......................................... 60/495; 60/502; 60/640; 417/337
[58] Field of Search ................. 60/495, 497, 500, 502, 60/503, 505, 506, 507, 639, 640; 417/331, 333, 337

[56] References Cited

U.S. PATENT DOCUMENTS

| | | | |
|---|---|---|---|
| 921,637 | 5/1909 | Vanderslice | 60/503 |
| 939,506 | 11/1909 | Hubmann | 60/503 |
| 1,139,995 | 5/1915 | Osterholtz | 60/503 |
| 4,599,857 | 7/1986 | Kim et al. | 60/640 |

*Primary Examiner*—Allen M. Ostrager
*Attorney, Agent, or Firm*—Birch, Stewart, Kolasch & Birch

[57] ABSTRACT

The present invention relates to a method and apparatus for power generation which comprises a first cylinder and a second cylinder, a first float member and a second float member disposed in the first and second cylinders, respectively, and a lever arm pivotably disposed above the cylinders, the ends portions of the lever arm being operatively connected to the respective float members. The lever arm contains weight members and defines a path for guiding the weight members to traverse the lever arm between the end portions. An inlet and outlet is provided for introducing and removing water into and from the first and second cylinders, the water being supplied from a dam whereby when the water is introduced into the first cylinder and simultaneously removed from the second cylinder, the first float member is caused to rise in the first cylinder and the second float member is caused to fall in the second cylinder. This causes the lever arm to pivot about its axis which, in turn, causes to weight members to relocate from one end portion of the lever arm to the other end portion thereof so that the out-put force resulting from the action of the lever arm alternating up and down such as in a see saw-type operation, can be utilized with other known apparatus such as generator or turbines by converting rotational motion to rectilinear motion, or rectilinear motion to rotational motion.

11 Claims, 7 Drawing Figures

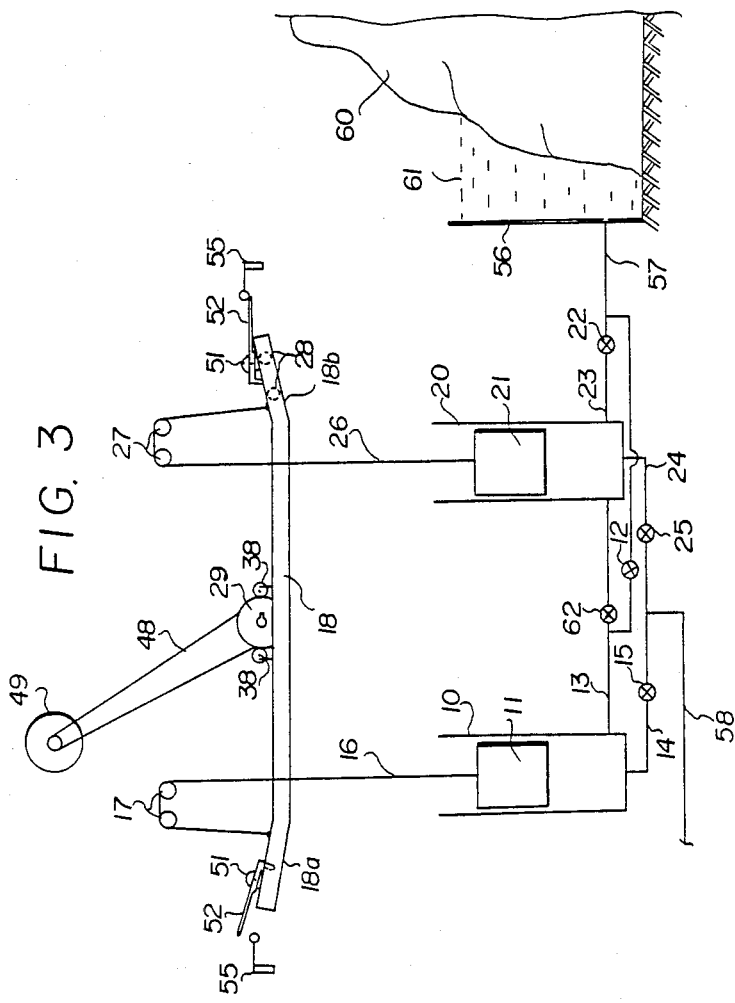
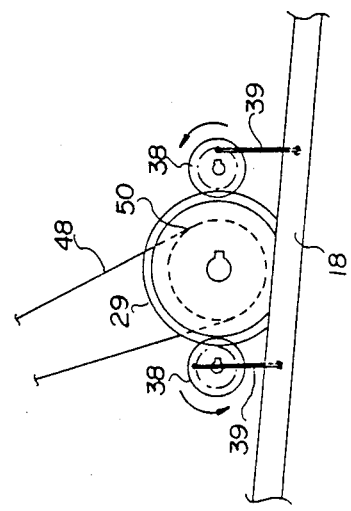

METHOD OF POWER GENERATION AND ITS APPARATUS UTILIZING GRAVITATION FORCE AND BUOYANCY

BACKGROUND OF THE INVENTION

The present invention relates to a method of power generation and its apparatus utilizing gravitation force and buoyancy, wherein a bigger out-put force than in-put can be obtained by adding to the in-put power the force generated by the action of gravity and buoyancy. More particularly, the present invention relates to a method and apparatus for power generation utilizing the gravitational force and buoyancy of water in the dam.

Previously, many methods and/or apparatus utilizing gravity and buoyancy principles have been developed which claim that they can be utilized to generate a larger out-put than in-put. However, such devices have proven to be only theoretical and thus do not have practical use for the claimed purpose.

Accordingly to the U.S. Pat. No. 4,599,857 entitled "method of power generation and its apparatus utilizing gravitation force and buoyancy" owned by the inventors of the present invention, it is notable that water to be supplied to the water supply tank must be pumped by a pump associated with the water drainage tank. Since power is required to drive the water pump associated with the water tanks, hoses and other equipments, the cost of operating the system may be considerably increased.

OBJECTS AND SUMMARY OF THE INVENTION

Accordingly, it is an object of the present invention to provide a method and an apparatus for power generation utilizing gravitational force and buoyancy.

Another object of the present invention is to provide a power generating apparatus which utilizes the potential energy of water stored in the dam.

A further object of the present invention is to provide a power generating apparatus which is positioned in stepwise elevations from the top to the bottom of the dam.

Still another object of the present invention is to provide a power generating apparatus which is both simple in application when compared to other devices such as generators, water wheels or turbines and also is low in manufacturing cost.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

The present invention relates to a method and an apparatus for power generation which comprises a first cylinder and a second cylinder, a first float member and a second float member disposed in the first and second cylinders, respectively, and a lever arm pivotably disposed above the cylinders, the ends portions of the lever arm being operatively connected to the respective float members. The lever arm contains weight members and defines a path for guiding the weight members to transverse the lever arm between the end portions. An inlet and outlet is provided for introducing and removing water into and from the first and second cylinders, the water being supplied from a dam whereby when the water is introduced into the first cylinder and simultaneously removed from the second cylinder, the first float member is caused to rise in the first cylinder and the second float member is caused to fall in the second cylinder. This causes the lever arm to pivot about its axis which, in turn, causes to weight members to relocate from one end portion of the lever arm to the other end portion thereof so that the out-put force resulting from the action of the lever arm alternating up and down such as in a seesaw-type operation, can be utilized with other known apparatus such as generator or turbines by converting rotational motion to rectilinear motion, or rectilinear motion to rotational motion.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2 diagrammatically shows the lever system for converting rectilinear motion to rotational motion as defined by the present invention;

FIG. 3 diagrammatically shows the mechanical system of the present invention whereas the actuating lever is disposed in a horizontal position;

DETAILED DESCRIPTION OF THE INVENTION

Figure 1:
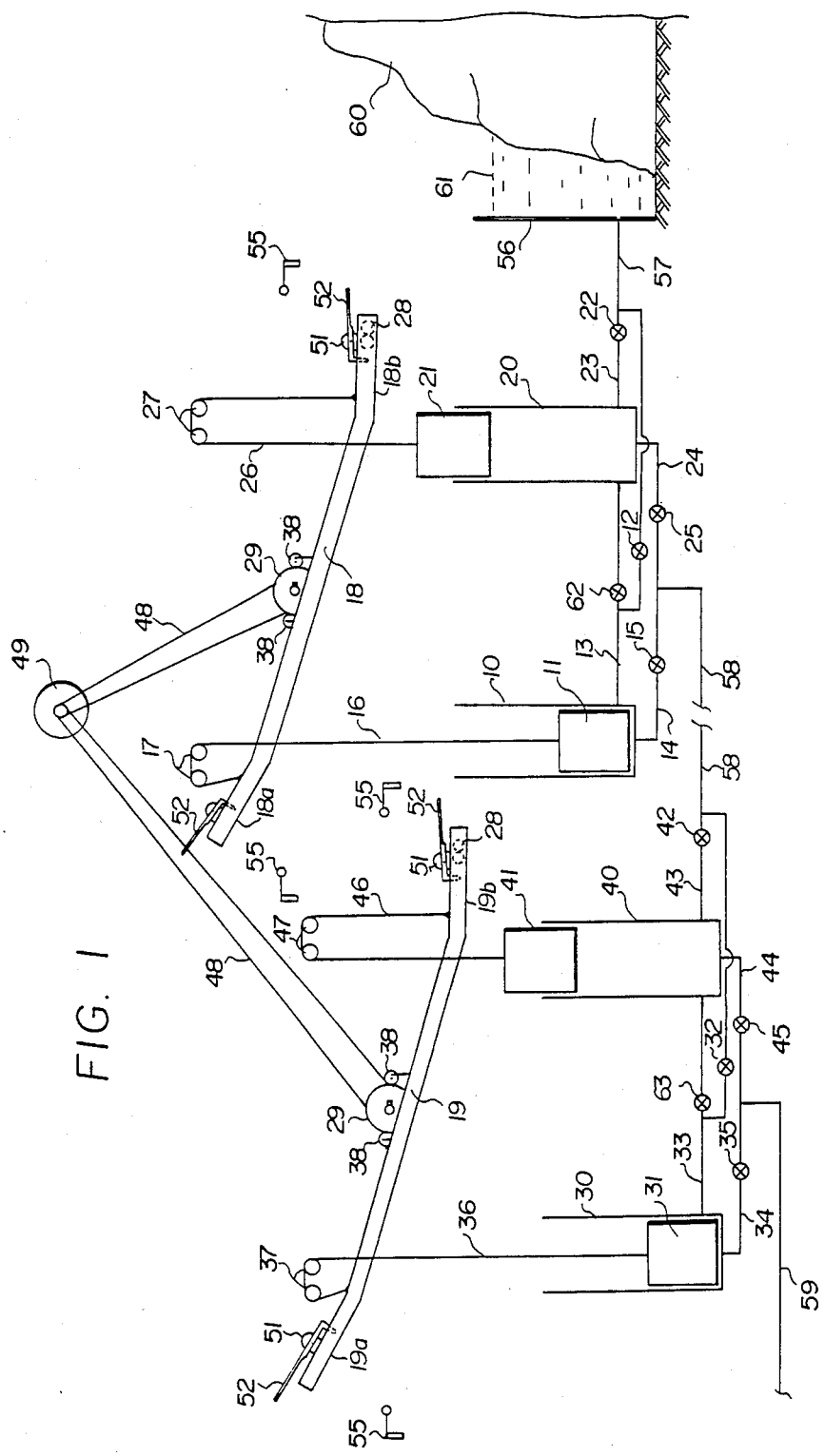
FIG. 1 diagrammatically shows the mechanical system of the present invention including two duplicate systems which are disposed at different levels below the water source (dam) for the generation of power.

Referring now in detail to the drawings for the purpose of illustrating the present invention, the apparatus for the generation of power as shown in FIG. 1 comprises a first cylinder 10 and a second cylinder 20 having an open, upper end, and a first float member 11 and a second float member 21 disposed in the first and second cylinders 10 and 20, respectively. The lower ends of cylinders 10 and 20 are provided with water supply pipes 13 and 23 which extend from main water supply pipe 57. The water supply pipe 57 is connected to the water dam 56 surrounded by mountains 60. Also, the cylinders 10 and 20 are connected to each other by the water supply pipe 13 to which a solenoid-type valve 62 is attached. In the water supply pipes 13 and 23, water supply valves 12 and 22 are respectively provided. The bottoms of the first and second cylinders 10 and 20 are respectively linked with water drainage pipes 14 and 24, and the other ends of the water drainage pipes 14 and 24 are connected to a first main water drainage pipe 58 which, if necessary, can be connected to a third and a fourth cylinder 30 and 40. To the water drainage pipes 14 and 24, water drainage valve 15 and 25 are respectively attached.

To the upper end open-type cylinders 10 and 20, the floats 11 and 12 occupying about one-half of the volume of the cylinder are inserted as pistons, leaving a peripheral clearance between the float and cylinder so that the float can move up and down smoothly, without interference. The clearance between the floats 11 and 21 and the cylinders 10 and 20 is maintained 3/1000–10/1000 of the inside diameter of the cylinder, respectively.

As to the operation of the solenoid-type valve 62, water supply valves 12 and 22 and water drainage valves 15 and 25, the solenoid-type valve 62 is to be operated independently for closing and/or opening water flow from one cylinder to the other and vice versa, whereas, water supply valve 12 on the water supply pipe 13 and water drainage valve 15 on the water drainage pipe 14, water supply valve 22 on the water supply pipe 24 and water drainage valve 15 on the water drainage pipe 25 are to be opened and closed simultaneously. The floats 11 and 21 are individually connected to the seesaw-type actuating lever 18. This actuating lever 18 is of a tube-type construction, the center axis of which is set at the symmetrical axis of the two cylinders 10 and 20. Thus, the out-put force resulting from the action of the actuating lever 18 and concentrated to the out-put axis area is transferred to a gear crank 29 through guide-gear members 38 which are connected to the actuating lever 18 through connecting rod members 39 (FIG. 2). The gear crank 29 having a track 50 can be connected to a generator 49, a turbine, a water wheel or the like through a belt 48. Thus, rectilinear motion is converted to rotational motion or rotational motional is converted to rectilinear motion.

Figure 5A:
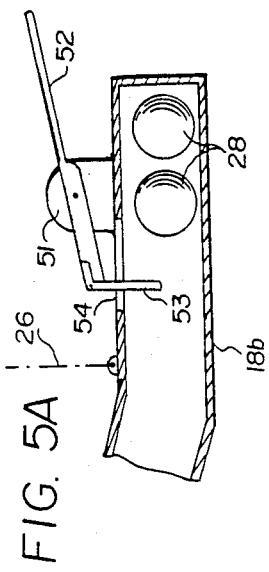
FIG. 5A and 5B are sectional views of the edge of the actuating lever according to the present invention showing the movement of the balls in facilitating the rotation of the actuating lever.
Figure 5B:
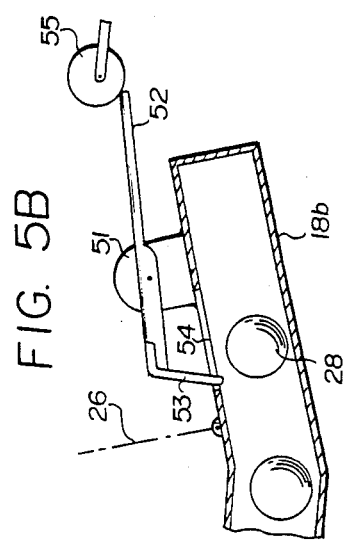
Figure 6:
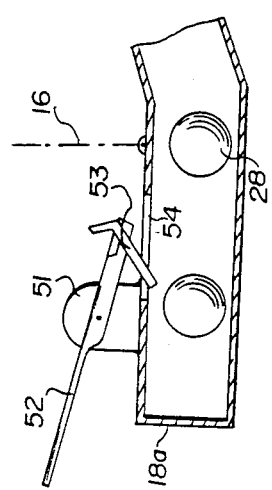
FIG. 6 is sectional view showing the introduction of the balls into the actuating lever.

The tube-type actuating lever 18 has, at each end, upward by extending oblique edges 18a and 18b which are provided with a bracket 51 and a gate lever 52 as shown in FIGS. 5A, 5B and 6. The gate lever 52 extends to the outside through the oblique edges 18a and 18b. The other end of the gate lever 52, is provided with a gate 53 operable to extend into the oblique edges of the lever 18. The gate 53 extends through a slot 54 to control the movement of the out-put balls 28. The gate lever 52 is put into action by a roller-type stopper 55 fixed to the moving end of the oblique edges 18a and 18b when the actuating lever 52 balances in the horizontal position along the fluctuation of floats 11 and 21.

The apparatus of the present invention can be moved up and down by adjusting the top of the first and second cylinders 10 and 20 below the water surface 61 of the dam 56 in a conventional manners.

Referring in detail to FIG. 1, there is illustrated an additional embodiment of an apparatus for the generation of power. Since the dam is located above ground level, there is utilized a plurality of apparatus of the present invention, wherein a second, duplicate apparatus of the present invention is positioned under the first apparatus, and wherein the tops of the third and fourth cylinders 30 and 40 are located below the main water drainage pipe 58 of the first apparatus.

As shown in FIG. 1, the second apparatus for the generation of power comprises third and fourth cylinder 30 and 40 having an open, upper end, and third and a fourth floats 41 disposed in the third and fourth cylinders 30 and 40, respectively. The lower portion of cylinders 30 and 40 are provided with water supply pipes 33 and 43 which are extended to connect with the main water drainage pipe 58 of the first apparatus. Also, the cylinders 30 and 40 are connected to each other by the water supply pipe 33, in which a solenoid-type valve 63 is disposed. To the water supply pipes 33 and 43, water supply valves 32 and 42 are respectively attached. The bottom portions of the third and fourth cylinders 30 and 40 are respectively linked with water drainage pipes 34 and 44, and the other ends of the water drainage pipes 34 and 44 are collaterally connected to a second main water drainage pipe 59 which, if necessary, can be connected to fifth and sixth cylinders (not shown). In water drainage pipes 34 and 44, water drainage valves 35 and 45 are respectively disposed.

The second apparatus of the present invention has same structure and function as the first apparatus of the present invention as described hereinafter. Accordingly, the output force from the seesaw-type actuating lever 19 of the second apparatus of the present invention is connected to the generator 49, a turbine, a water wheel, or the like through the connecting rod members 39, the guide-gear members 38 and gear crank 29.

In operation, as shown in FIG. 1, the water supply valve 22 is open to supply water to the second cylinder 20 and, simultaneously, the drainage valve 15 is opened to drain the first cylinder 10 completely. The float 21 within the second cylinder 20 is, then, raised due to the buoyant force of the water, while the first float 11 is lowered due to gravitational force. Accordingly, as the float 21 is raised, the edge 18b of the actuating lever 18 is lowered. As the actuating lever 18 is lowered, the out-put increasing balls 28 move to the end of the oblique edge and the gate 52 closes to position the balls within the oblique edge.

As soon as the apparatus is positioned as shown in FIG. 1, the water supply valve 22 and the drainage valve 15 are closed, and at the same time, the solenoid-type valve 62 in the pipe 13 is opened. The water introduced into the second cylinder 20 then flows naturally to the first cylinder 10 through the pipe 13 and, thus, the two floats 11 and 21 are positioned at the same height, respectively. As the water flows between cylinders 10 and 20, the actuating lever 18 moves counter clockwise to the horizontal position and the out-put increasing balls 28 confined within the edge 18b move toward the central axis of the actuating lever 18 due to gravity, but are stopped by the gate 53 (FIG. 5A).

Figure 4:
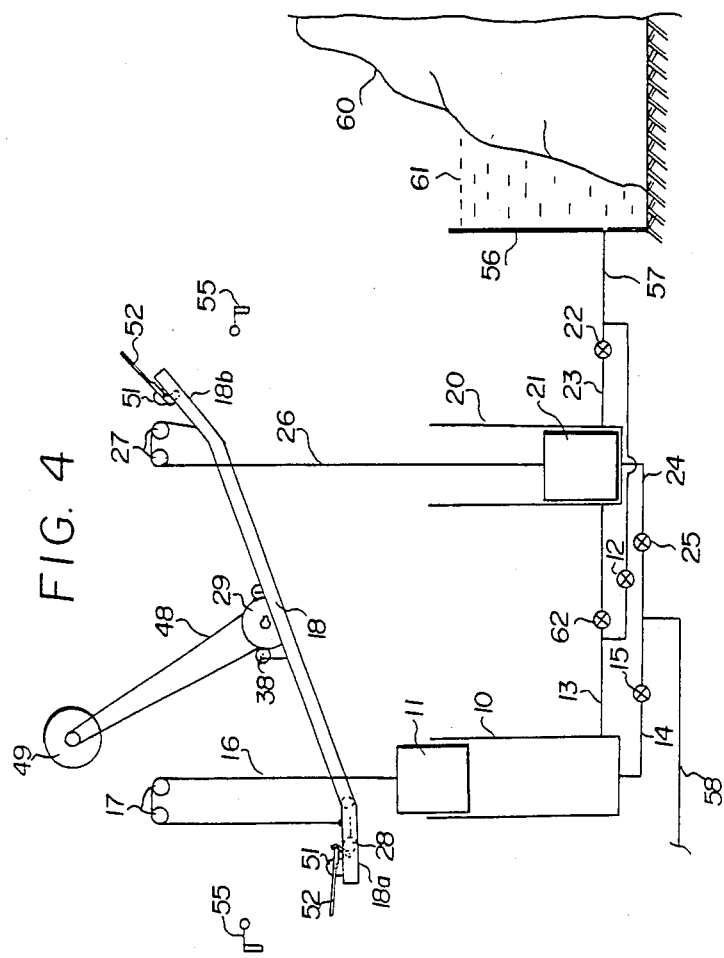
FIG. 4 diagrammatically shows the mechanical system of the present invention whereas the position of the actuating lever is reversed from that shown in FIG. 1.

In succession, the solenoid-type valve 62 is close and the drainage valve 25 and the water supply valve 12 are jointly opened. The actuating lever 18 is then moved to the opposite position from that of FIG. 3 to that of FIG. 4. As the actuating lever 18 moves up, the gate lever 52 installed on the edge 18b is held by the stopper 55 and thus the gate 53 is lifted to release the out-put increasing balls 28 (FIG. 5B). The balls, as released, move forward to the other end of the actuating lever with a positive acceleration and enter into the edge 18a, pushing the gate 53 open, as shown in FIGS. 3 and 6.

At this time, the guide gears 38 reciprocally rotate counter clockwise and clockwise in the directions indicated by the arrows shown in FIG. 2. Accordingly, the crank 29 rotates in the clockwise direction and the belt 48, associated therewith, actuates the generator 49, or the like.

By constantly repeating this series of back and forth operations, an increased out-put force can be obtained from the actuating lever 18. Also, simultaneously, the second apparatus of the present invention operates to induce the out-put force to the generator 49 or the like.

One of the important features of the present invention is the clearance between the float and cylinder and, the water level in which the first and second floats 11 and 21 are immersed.

Also, the present invention utilizes the flow of water from a dam. Also, a plurality of apparatus can be installed at various levels from the top of the dam to the bottom thereof.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. An apparatus for the generation of power which comprises:

at least first cylinder and at least second cylinder, at least first float member and at least second float member disposed in said at least first and second cylinders, a lever arm pivotably disposed above the cylinder, the end portions of said arm lever being operatively connected to said respective float members, said lever arm containing weight members and defining a path for guiding said weight members to traverse said lever arm between said end portions, a crank member rotatably disposed on a crank shaft, said crank member connected to the center portion of said lever arm through connecting rods and guide-gears, a dam which provides a source of water, means for removing water from said dam and alternatively introducing and removing said water to and from said at least first and second cylinders, whereby when the water from said dam is introduced into said at least first cylinder and, simultaneously, removed from said at least second cylinder, said at least first float member is caused to rise in the first cylinder and said at least second float member is caused to fall in the second cylinder, causing the lever arm to pivot about its axis which, in turn, causes to weight members to relocate from one end portion of the lever arm to the other end portion thereof, and causing the crank to rotate about its crank shaft for the generation of power.

2. The apparatus of claim 1 wherein the first and second main cylinders are located below the water surface of the dam.

3. The apparatus of claim 2 wherein the first and second main cylinders are provided with a main drainage pipe which is located over a first and second alternative cylinders.

4. The apparatus of claim 1 wherein a plurality of the cylinders can be installed at step after step from the top area to the lower area of the dam.

5. The apparatus of claim 1 wherein both end portions of the lever arm are canted relative to the lever arm.

6. The apparatus of claim 5 wherein the canted end portions contain gate means for containing the weight members therein, during the intermediate positions of the levers arm, but releases said weight members when the lever arm is disposed in positions beyond said intermediate positions.

7. The apparatus of claim 1 wherein the lower portions of the first and second main cylinders are connected to water from the dam.

8. The apparatus of claim 1 wherein the cylinder has twice the volume of the float.

9. The apparatus of claim 1 wherein the clearance between the float and cylinder is from 3/1000 to 10/1000 of the inside diameter of the cylinder.

10. The apparatus for the generation of power of claim 1 wherein the lever arm is a tube member and the weight members are weighted balls disposed in said tube member.

11. A method for the generation of power utilizing first and second cylinders containing float members disposed therein, a pivotally disposed lever arm connected to said float members said lever arm containing a weight member which is free to move therein and means for introducing water into said cylinders and removing said water from said cylinders which method comprises:

introducing water from a dam into said first cylinder and simultaneously removing a like amount of water from said second cylinder, whereby said water distribution causes the float member to rise in said first cylinder and fall in said second cylinder which in turn causes the lever arm to pivot about its axis which transfers the weight member from one end portion of the lever arm to the other end portion thereof, causing the lever arm to move up and down and causing the crank to rotate about its crank shaft for the generation of power.

* * * * *